Sept. 13, 1966  C. KRATZ  3,272,154
COMPACT SELF-UNLOADING BAKING OVEN
Filed Sept. 9, 1964  3 Sheets-Sheet 1

INVENTOR
CLYDE KRATZ
BY Bilker + Moyerman
ATTORNEYS.

Sept. 13, 1966  C. KRATZ  3,272,154
COMPACT SELF-UNLOADING BAKING OVEN
Filed Sept. 9, 1964  3 Sheets-Sheet 2
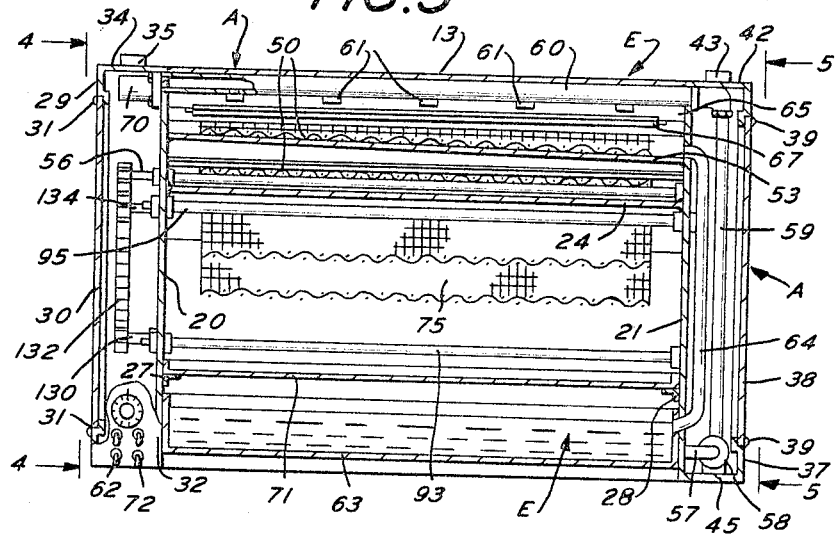
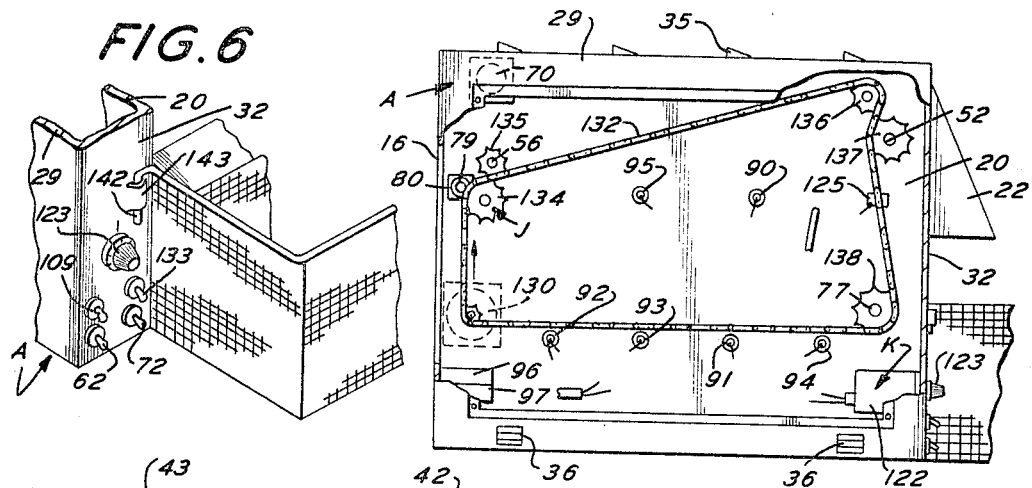
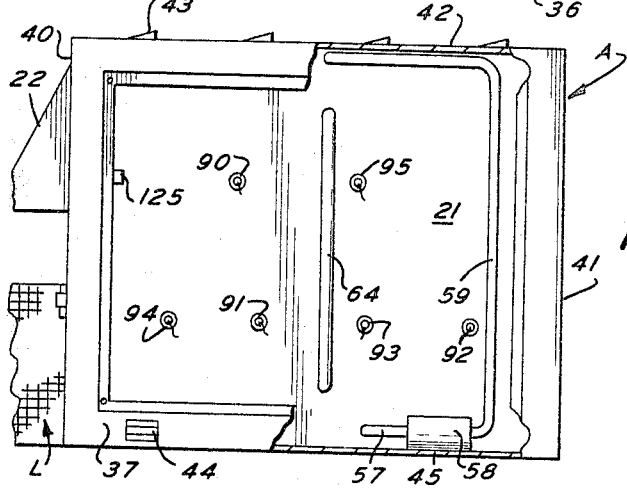
INVENTOR
CLYDE KRATZ
BY Bilker + Moyerman.
ATTORNEYS.

United States Patent Office 3,272,154
Patented Sept. 13, 1966

3,272,154
COMPACT SELF-UNLOADING BAKING OVEN
Clyde Kratz, Norristown, Pa., assignor to K & N Soft Pretzel Company, Inc., Norristown, Pa., a corporation of Pennsylvania
Filed Sept. 9, 1964, Ser. No. 395,155
10 Claims. (Cl. 107—4)

This invention relates to a compact, self-unloading, continuous food baking oven. More particularly, it relates to a compact apparatus for baking edible products such as, for instance, soft pretzels wherein the food product is, seriatim, treated with a caustic solution, proved, sprinkled with salt, baked, and stored at elevated temperature on a continuous basis.

Certain baked products, such as soft pretzels, bagel and the like, are at their best when served warm and freshly baked. Obviously, distribution from a central baking plant is less suitable for a product of this type than is on-premises baking. Consequently, there has arisen a type of retail operation wherein the retailer receives frozen products, in unbaked form, and bakes them in situ for relatively immediate customer consumption. While such retail establishments are in a sense bakeries, their operators possess none of the baker's traditional skills and place heavy reliance upon rugged, simple and fool-proof machinery.

Accordingly, it is an object of this invention to provide a small, portable and rugged oven for small retail establishments which can be used inter alia to bake soft pretzels from frozen, unbaked pretzels.

It is a further object of this invention to provide an oven wherein the steps of treating the pretzels with caustic, proving, salting and baking the pretzels are performed automatically, seriatim, with the manner and length of each operation a parameter of the apparatus.

It is also an object of the invention to provide recirculating spray means for the treatment with caustic wherein uniformity of application is guaranteed and wherein therein there is no waste of caustic liquor.

Still another object of the invention is to utilize what would otherwise be waste heat from the oven for heating of the caustic solution and for the initial thawing out of the frozen products.

An additional object of the invention is to provide an oven wherein the operator need only give his attention to the loading operation and where the total baking operation as well as the unloading is automatic.

Among the other objects of the invention are the provision of an oven wherein baked products are automatically unloaded into a storage receiver and where, in that receiver, they are kept warm and in as-baked condition.

It is also an object of the invention to provide an oven wherein salting of pretzels may be performed on either side or on both sides as warranted by the operator's desire and market conditions.

It is still another object of the invention to provide an oven construction wherein all side walls are insulated by flow of air to reduce outside temperature to safe-to-the-touch limits while simultaneously venting the apparatus.

It is also an object of the invention to provide an oven divided into upper and lower superimposed zones wherein the product flows from front to rear and then from rear to front minimizing the length required for the oven, minimizing heat losses and minimizing floor space requirements.

Also, among the objects of the invention, it is the provision of an oven of the character described which is sturdy in construction, light in weight, economical to produce and install, and highly efficient in operation.

These and other related objects of the invention will be apparent to those skilled in the art from a consideration of the description which follows, when read in conjunction with the accompanying drawings, in which:

FIGURE 3 represents a fragmentary transverse section through the oven taken along line 3—3 of FIGURE 2.

FIGURE 4 represents a fragmentary section taken along line 4—4 of FIGURE 3 which is, in effect, an end view of the machine with the side wall partially removed.

FIGURE 5 represents a fragmentary sectional view taken along line 5—5 of FIGURE 3.

FIGURE 6 represents a fragmentary perspective view of details of the oven control panel and the pretzel receiving basket.

Figure 2:
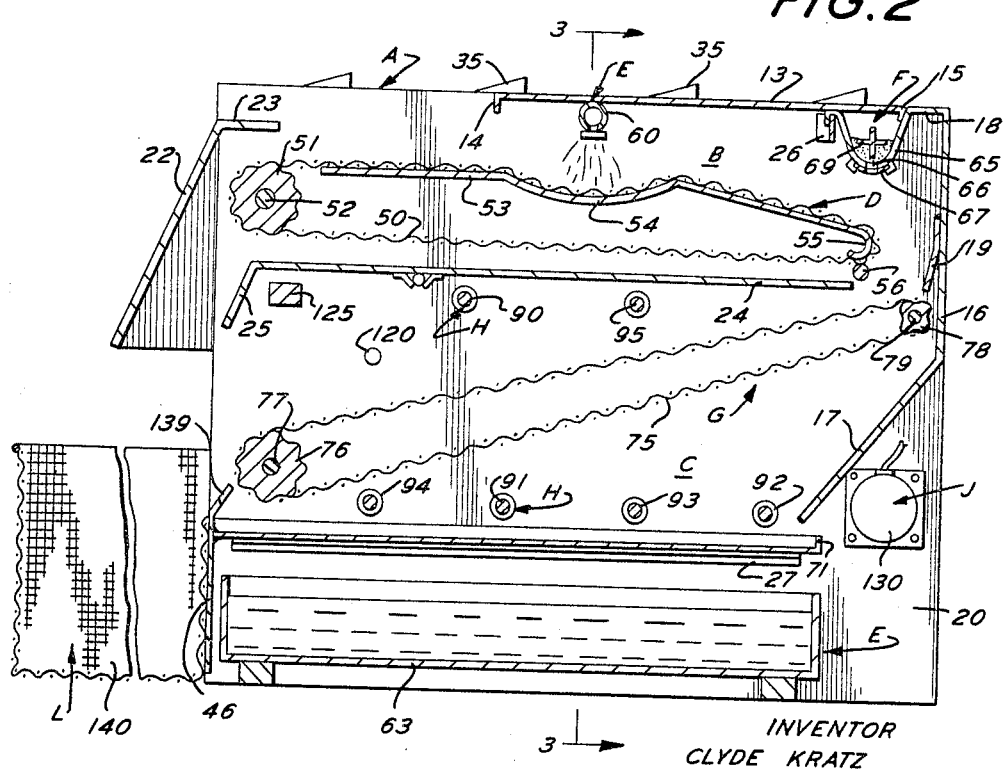
FIGURE 2 represents a fragmentary longitudinal section taken along line 2—2 of FIGURE 1.

Referring now to the drawings, wherein like reference numerals designate like parts, it will be observed that the oven of the invention comprises a generally parallelepipedal housing A which is internally divided into an upper proving zone B and a lower baking zone C (see FIGURE 2). Proving zone B contains, inter alia, longitudinal conveyor means D and elements of caustic spray and recirculation means E as well as elements of salting means F. Within the baking zone C are located a second conveyor G and heating means H, including an infrared radiator. The oven also includes unitary conveyor drive means J (FIGURE 4), thermostatic modulating means K, and finished product receiver L. These components will now be discussed in detail.

Figure 1:
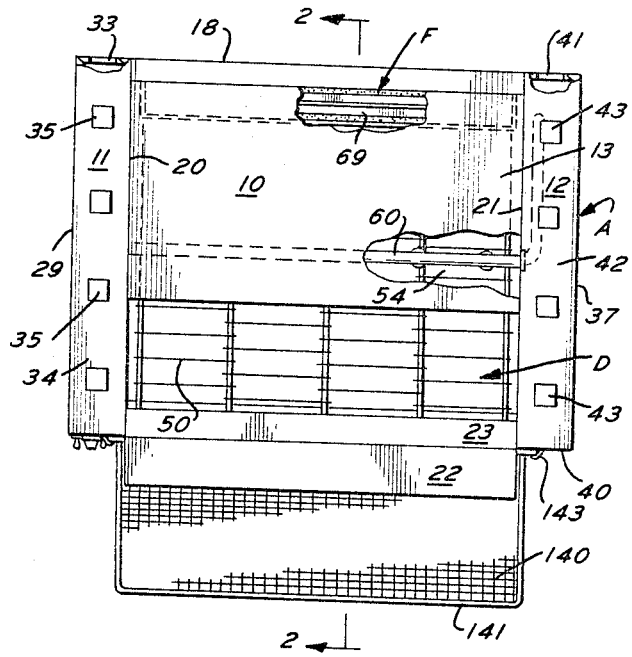
FIGURE 1 represents a top plan view of an oven embodying the invention, partially cut away to show internal details.

Housing A is generally parallelepipedal and, as best seen in FIGURE 1, comprises a central portion 10, a left-wing portion 11, and a right-wing portion 12. As best shown in FIGURE 2, the central portion 10 comprises a removable top plate 13 including a front flange 14 and a rear flange 15. The central portion 10 further includes a rear wall 16 which terminates in an angled bottom portion 17. The top of rear wall 16 may be bent at right angles to form a continuous horizontal top portion 18. Rear wall 16 is also provided with an internal pretzel deflector plate 19 proximate the transverse boundary between proving zone B and baking zone C.

The central portion 10 has a short front wall 46 and is further provided with a left internal wall 20 and a right internal wall 21, both of which extend the full height and depth of the oven. A plurality of members, which perform definite independent functions, also serve to keep walls 20 and 21 in rigid, spaced-apart relationship and are attached by conventional means such as, for instance, welding to walls 20 and 21. These members include, for example, hood 22 which terminates in flat portion 23, transverse divider plate 24 which includes a forward integral guide vane portion 25, and guide plate 139. Walls 20 and 21 are also spanned, near the rear of the oven, by a channel 26. Additionally, wall 20 has attached thereto an internal longitudinal support channel 27 and wall 21 is provided with a similar longitudinal channel 28 in transverse alignment with channel 27.

Left-wing portion 11 is provided with an external wall 29 which is parallel and spaced-apart from internal wall 20. Wall 29 is preferably provided with a removable access plate 30, suitably mounted thereon as with a plurality of screws 31 (see FIGURE 3). Wing 11 is further provided with a front wall 32, a rear wall 33 which, if desired, may be integral with rear wall 16, and a top wall 34, including a plurality of ventilators 35. Wall 29 is preferably provided with a plurality of inlet louvers 36 (see FIGURE 4) which cooperate with ventilators 35 to permit thermal circulation of air.

In an almost identical mirror-image manner, right-wing portion 12 is provided with an external wall 37 having an access plate 38 secured thereto by a plurality of screws 39. Wing portion 12 is also provided with a front wall 40, a rear wall 41 and a top 42 provided with a plurality of ventilators 43. Wall 37 is preferably provided with a plurality of inlet louvers 44 which cooperate with ventilator 43. Walls 21 and 37 are preferably connected near their bottom with a pump mounting plate 45, which may conveniently take the form of a longitudinally extending channel.

Transverse divider plate 24 divides the interior of the housing A into a proving zone B and a baking zone C. Within the proving zone B are located a continuous longitudinal conveyor D, caustic spray means E and salting means F. These will now be discussed.

Conveyor D comprises an open mesh wire work belt 50 which is driven by a belt sprocket 51 mounted on a drive shaft 52. The belt 50 passes over a belt support plate 53 which includes a central troughed portion 54 and a hooked return portion 55. Plate 53 is attached, as by welding, to walls 20 and 21 and, as may be seen best in FIGURE 3, is pitched toward wall 21. As belt 50 returns over hooked portion 55, it is contacted by a driven doctor roll 56, which may conveniently take the form of a shaft juxtaposing the belt, in a continuous wiping arrangment. Any conventional belting may be used provided it is of open work, and provided, further, that it is of salt and caustic-resistant material such as stainless steel, polyethylene-coated wire, and the like.

Trough portion 54 constitutes an important component of the caustic spray system E which will now be discussed. Trough 54 is pitched toward drain pipe 64 which conveys caustic by gravity flow to a reservoir 63 conventionally and removably mounted in the bottom of the oven. Access to the reservoir may be had from the open lower rear of central portion 10. A detachable suction line 57 leads from the reservoir to a caustic pump 58 which is mounted on plate 45. A switch 62, mounted on wall 32, controls the pump. Discharge line 59 conducts caustic under pump discharge pressure to a caustic header 60, including a plurality of adjustable spray nozzles 61 which is located between walls 20 and 21 and which is aligned with trough portion 54. The spray pattern is such as to confine the caustic solution to portion 54 and recirculate it without overflow loss. The continual recirculation keeps the solution of uniform concentration and fully utilized.

Salting means F is located in the rear of zone B and salting is the last operation performed in the zone. The salt is periodically loaded in a trough 65, which adjoins horizontal top wall portion 18 and which, in fact, may be conveniently and economically fabricated as a continuation thereof. In the embodiment shown, the forward end of the trough engages and is supported by channel 26. Access to the trough for loading purposes may be had by removal of top plate 13, flange 15 of which abuts the interior of the trough as shown in FIGURE 2. Discharge from the trough is vertically through a series of slots 66. Quantity of flow is controlled by a reciprocally positionable control plate 67 containing a plurality of slots 68 therein, of the same size and spacing as slots 66, adapted to be placed in registration with slots 66 for maximum discharge and misaligned therewith for minimum discharge. The position of plate 67 need be set only once for a particular type of operation using a particular grade of salt. The salt is continually urged into discharge position and bridging is prevented by a feeder or wiper such as, for example, brush 69 which is directly driven by motor 70, operated by a switch 72 mounted on wall 32. The remainder of the salting system is a re-use salt tray 71 which is removably mounted on channels 27 and 28. It may be withdrawn at any time from the rear of central portion 10 and the salt contained therein dumped into trough 65. Because the conveyor belts are foraminous and because of plates 17 and 19, salt not adhering to the baked products will fall into the tray 71 and be reclaimed.

Baking zone C contains the second longitudinal conveyor G. As seen in FIGURE 2, this conveyor slopes downwardly from the rear of the oven toward the front of the oven and the angle at which it slopes is a function of the desired transference action from conveyor D. Briefly, its slope and extension beyond the terminus of conveyor D will determine whether the edible products being transferred are turned over during the course of transference so as to be salted on both sides thereof or whether the same side faces upward throughout the entire operation.

Turning to the exemplary mechanical details shown, the conveyor G includes a belt 75 which has the same mechanical characteristics as belt 50. This belt is driven by belt sprocket 76 mounted on a drive shaft 77. At its remote end, the belt 75 passes around an idler sprocket 78 which is, in turn, mounted on a shaft 79, each end of which is journaled, as with journal bearings 80, into walls 20 and 21.

Baking zone C contains heating means H including heating elements 90, 91, 92, 93, 94, 95 and infrared radiator 125. These are shown physically in FIGURES 2, 3, 4 and 5 and diagrammatically in FIGURE 7. As best seen in FIGURE 2, heating elements 90, 95 and 125 are positioned above conveyor G whereas elements 91, 92, 93 and 94 are positioned beneath the conveyor. As shown in FIGURES 4 and 5, the elements penetrate interior walls 20 and 21 entering, respectively, the interior of wings 11 and 12 wherein the necessary wiring connections are made and wherein the wires are appropriately connected to relays 96 and 97, thermostatic modulating means K and a three-wire, 110–220-volt service box 98, all shown diagrammatically in FIGURE 7. These heaters provide heat for the baking conducted in zone C. However, heat is also provided by these elements for zone B and, because of the indirect heating of trough portion 54, what would otherwise be waste heat keeps the caustic solution warm, increasing its efficacy.

The construction of wings 11 and 12 with spaced-apart walls (e.g. 20 and 29) inlet air louvers (e.g. 36) and ventilators (e.g. 35) keeps the external side walls of the apparatus cool by virtue of conductive currents and, further, keeps all equipment components located within wing portions 11 and 12 at temperatures lower than those found in the interior of the oven structure.

Figure 7:
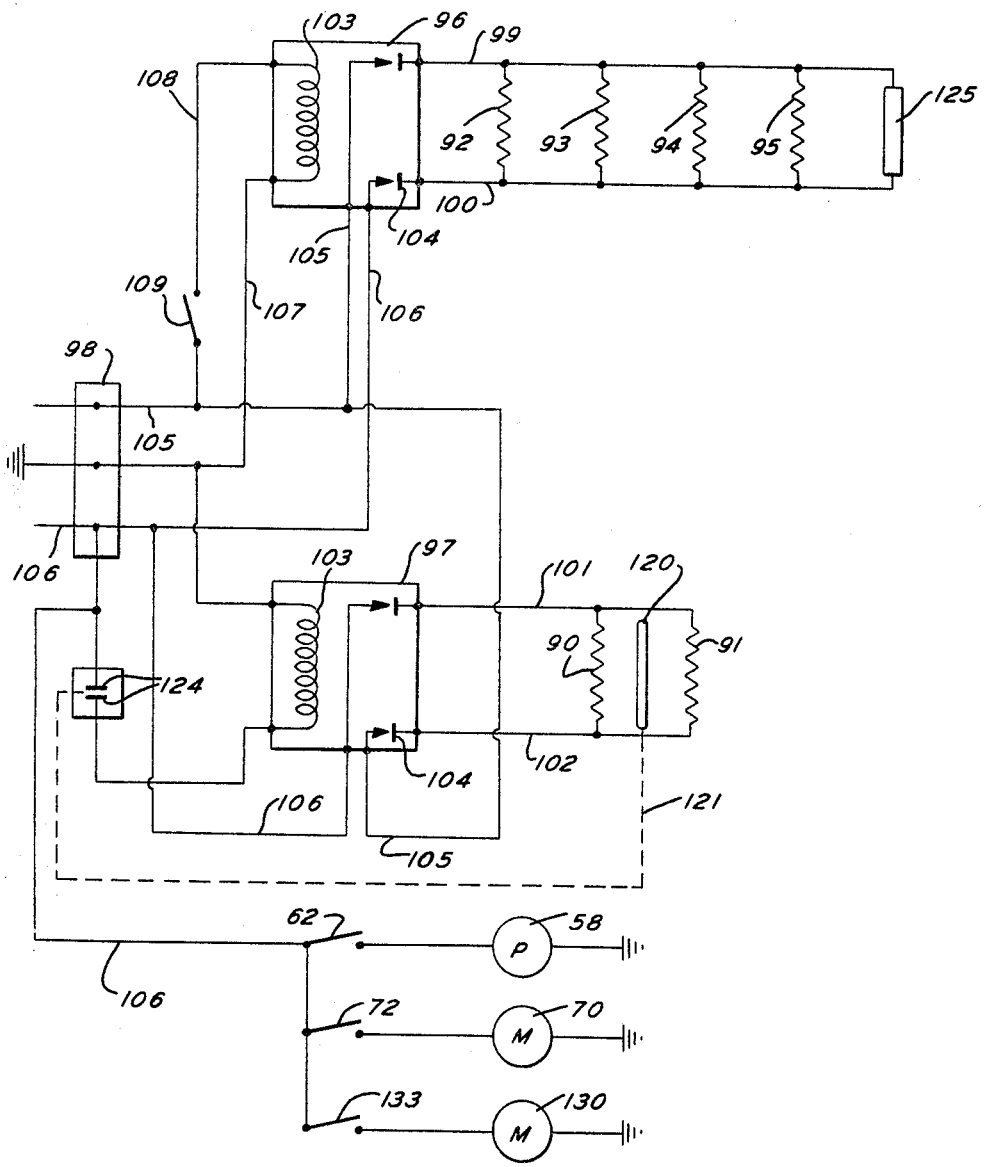
FIGURE 7 represents a diagrammatic electrical schematic of the motors, switches, and heating elements utilized in the embodiment of the invention shown and described.

The electrical arrangement of heating means H is detailed in FIGURE 7 and, consequently, no wiring connections are shown in the remaining figures. The exact routing of the various wires, as well as the placement of components, such as the relays, may be varied as necessitated by particular embodiments of the invention. Elements 92, 93, 94, 95 and 125 are connected in parallel between lines 99 and 100 and are controlled by relay 96. Elements 90 and 91 are connected in parallel between lines 101 and 102 and are controlled by relay 97.

Relays 96 and 97 are fo a conventional type having a double-pole, single-throw switching action with relay coils, in this instance, rated for 110-volt operation. They each comprise a relay coil 103 and a plurality of normally-open contacts 104. Upon energization of coil 103, contacts 104 close and remain closed until current ceases to flow through the coil.

Power lines 105 and 106 each contain 110-volt current, measured with respect to ground 107, and consequently 220 volts are available between lines 105 and 106. All of the heating elements shown in this embodiment are intended for 220-volt operation and are conventionally available.

Power leg 108 which goes to the coil of relay 96 contains a switch 109 which is mounted physically on front wall 32. As long as this switch is closed, the contacts in relay 96 remain closed and, consequently, electricity is continually supplied to heating elements 92, 93, 94, 95 and 125.

The switching function for relay 97 is performed by thermostatic modulating control K. This control includes a sensing element 120 positioned, as shown in FIGURE 2, proximate the discharge end of conveyor G, a capillary 121, a housing 122 and a dial 123 mounted on wall 32. The thermostat contains a pair of normally closed contacts 124 which open upon a rise in temperature above a set limit as detected by element 120 and transmitted, via capillary 121 (in the form of an increase in gas pressure), to a diaphragm located within the housing. The diaphragm in turn activates a snap-action mechanism linked to the contacts. Devices such as these are conventional and form no part of the claimed invention. A particular device found suitable for the purpose is the double-pole, single-throw, direct-acting electric temperature control described in Bulletin No. RT-801 of the Robertshaw-Fulton Controls Company and designated as their model EA3. It is thus apparent, that whenever the temperature preset on dial 123 is not being achieved in the vicinity of element 120, the contacts 124 will close supplying electricity to heating elements 90 and 91. The device may also be set via dial 123, to a permanent "off" position acting as an on-off switch.

The overall heating operation, as will be apparent from a study of the figures, is one of modulation rather than on-off operation. The continuing operation of the elements controlled by relay 96 brings the entire interior of the oven to a point at the low end of any desired temperature range which is a function of the intended purpose and consequent design of the apparatus. Operation anywhere within the design range can be secured by appropriate settings of control K. However, in no event will there be a falling off of temperature below the minimum end of the range and, consequently, the fluctuations within the oven are extremely limited despite varying external conditions and despite variations in baking loads.

As shown on FIGURE 7, power for the various ancillary motors which have been and will be discussed may also be taken from line 106 and controlled by the indicated switches which are mounted on wall 32.

Infrared heat is provided by a primary radiator 125 as well as vane 25 which functions as a secondary radiator and, further, directs infrared heat toward receiver L. Radiator 125, as shown in FIGURE 7, is wired in parallel with those heating elements which remain continually in operation, and like them, its operation is also continuous. Consequently, infrared heat is always being directed downwardly and outwardly from the discharge point of conveyor G toward receiver L.

Conveyor drive means J comprises a motor 130, mounted in oven portion 10 on wall 20 with its shaft 131 protruding into wing portion 11 and pinioned to drive a chain 132. Motor operation is controlled by a switch 133 mounted on wall 32. As best shown in FIGURE 4, the chain passes over an idler sprocket 134, appropriately journaled onto wall 20, drives doctor 56 by means of an appropriate doctor sprocket 135, passes over a second idler sprocket 136, also appropriately journaled onto wall 20, drives shaft 52 of conveyor D, by means of a sprocket 137 keyed thereupon, and, finally, drives shaft 77 of conveyor G, by means of a drive sprocket 138 keyed thereupon. It is thus seen how the speeds of conveyors G and D are synchronized by virtue of sharing a unitary drive means J.

Baked products, being discharged from conveyor G pass over guide plate 139, which may be formed integrally with wall 46, into wire basket 140. This basket is provided with a perimetrical reinforcing rod 141 which rod terminates in integral downwardly-bent lugs 142. These lugs are adapted to be removably received and retained by sockets 143 which are provided on front walls 32 and 40 of wing portions 11 and 12. As the pretzels come off conveyor G in warm, fully-baked condition, they drop automatically into basket 140. While retained therein, they are subjected to infrared heat from radiator 125 and are thus kept warm and in ready-to-eat condition. When a basket becomes full, the operator need only exchange it for an empty basket and then need devote no more attention to the unloading operation unless and until the new basket becomes filled.

In operation, unbaked frozen pretzels are placed upon conveyor 50 through the loading station, which is the area defined between hood portion 23 and flange 14. The conveyor carries them rearward into through 54 where they are subjected to the caustic spray from nozzles 61. The flow rate of the nozzles, the speed of the conveyor, and the depth of trough 54 are all part of the design of the particular apparatus which, in turn, is a function of the product for which the oven is designed. After spraying, the pretzels continue through the proving zone until they come beneath salting means F and the surface which is pointing upward receives and retains an appropriate quantity of salt. Excess salt travels downward through the open mesh of belts 50 and 75, is deflected by angled wall portion 17 and is collected in tray 71. The pretzels having been caustic treated, proved, and salted on one side, drop off conveyor D and onto conveyor G. Any pretzels which tend to stick to the belt 50 are physically removed by power driven doctor roll 56.

Design of the unit, namely the shape of plate 19, and the amount of extension of conveyor G beyond the terminus of conveyor D as well as the angle between the conveyors will predetermine whether the pretzels being transferred are turned over during the transfer or whether the same side remains upward throughout the entire operation. If it is desired to salt both sides of the pretzel, the unit is designed to effect a turnover and the quantity of salt being fed is increased accordingly. As the pretzels are carried forward by conveyor G, baking is completed. As discussed above the thermostat keeps the oven at optimum baking conditions.

In summary, the entire apparatus makes it possible for an unskilled operator to rely totally upon a simple-to-operate, automatic apparatus for the baking of pretzels. He need only load pretzels in their frozen unbaked state, as warranted by demand, and need not be present at the instant that baked pretzels come out of the unloading station. On the contrary, by scheduling the insertion of frozen pretzels to meet the conditions of his market and by relying upon the storage capacity of receiver L and the ability of the infrared means to keep its contents warm, he can devote his time to sales and pay minimum attention to the entire operation. It is thus seen how the embodiment of the invention described achieves the above objects of the invention.

Although the invention has been described in considerable detail, such description is intended to be illustrative rather than limiting since the invention may be variously embodied. Therefore, the scope of the invention is to be determined only by the appended claims.

Having described my invention, I claim:

1. A self-unloading food baking oven comprising a longitudinally extending housing; a transverse plate dividing the interior of the housing into a proving zone and a baking zone; a first longitudinal conveyor in the proving zone adapted to carry products placed thereupon through said proving zone; means in said proving zone for spraying products on said first conveyor with caustic; means in said proving zone for depositing salt on products as they leave the proving zone; a second longitudinal conveyor in the baking zone adapted to carry products placed thereupon through said baking zone and aligned with said first conveyor so as to effect transfer of products from one to another; said first conveyor being loaded proximate the front of said housing and said second conveyor automatically discharging proximate the front of said housing; and heating means within said baking zone to supply heat thereto as well as to said proving zone.

2. The oven of claim 1 which further includes a finished product receiver positioned outside the housing to receive products discharged from said second conveyor and additional heating means, within said baking zone which project heat to said storage means to keep products therein warm.

3. A self-unloading pretzel oven comprising a generally parallelepipedal housing having front and rear walls; a generally horizontal plate dividing the interior of said housing into an upper proving zone and a communicating lower baking zone in alignment therewith; a first continuous longitudinal conveyor in said proving zone adapted to transport edible products placed thereupon from front to rear of the zone; a second continuous longitudinal conveyor in said baking zone adapted to transport edible products from the rear to the front of said zone and positioned to receive products discharged from said first conveyor; synchronized drive means for said conveyors; caustic spray means intermediate said proving zone for applying caustic solution to edible products carried on said first conveyor; salting means proximate the discharge point of said first conveyor adapted to apply salt to products being transferred from said first to said second conveyor; modulated heating means within said baking zone for supplying heat to said zone, to said proving zone and to the solution fed to said caustic spray means; frozen unbaked edible products placed on the front of said first conveyor being subjected seriatim to caustic treatment, proving, salting, baking and being discharged in baked, ready-to-eat state by said second conveyor.

4. The oven of claim 3 which further includes a finished product receiver positioned outside the housing into which said second conveyor discharges, and infrared heating means within said baking zone which project heat to said receiver to keep products therein warm.

5. A self-unloading pretzel oven comprising a generally parallelepipedal housing having a front wall and a rear wall; a generally horizontal plate dividing the interior of said housing into an upper proving zone and a communicating lower baking zone in vertical registration therewith; a first continuous longitudinal conveyor within said proving zone adapted to transport edible products through said zone from front to rear; a second continuous longitudinal conveyor within said baking zone, positioned to receive products discharged from said first conveyor and transport them through said zone from rear to front; caustic application means within said upper zone for treating edible products, being carried by said first conveyor, with caustic; means for salting the edible product during transfer from said first conveyor to said second conveyor; thermostatically modulated heating means within said lower baking zone which provide heat for baking, heat for the proving zone and heat for the caustic solution; and unitary synchronized drive means for said conveyors; whereby unbaked products may be loaded at said loading station, automatically treated with caustic, proved, salted, baked, discharged and maintained at constant temperature.

6. The oven of claim 5 wherein a doctor roll is provided at the rear terminus of said first conveyor to mechanically remove any edible products clinging thereto.

7. A self-unloading pretzel oven comprising a generally parallelepipedal housing having a front wall and a rear wall; a generally horizontal plate dividing the interior of said housing into an upper proving zone and a communicating lower baking zone in stacked relationship; a first continuous longitudinal conveyor within said proving zone adapted to transport edible products through said zone from front to rear; a second continuous longitudinal conveyor within said baking zone, positioned to receive products discharged from said first conveyor and transport them through said zone from rear to front; continuous spray means within said upper zone for treating edible products, being carried by said first conveyor, with caustic; means for salting the edible product during its transfer from said first conveyor to said second conveyor; a loading station proximate the front of said first conveyor; finished product receiver outside said housing proximate the discharge point of said second conveyor into which edible products thereupon are continuously deposited; thermostatically modulated heating means within said lower baking zone which provide heat for baking, heat for the proving zone and heat for the caustic solution including an infrared radiator positioned so as to keep the contents of said finished product receiver warm; and unitary synchronized drive means for said conveyors; whereby unbaked products manually loaded at said loading station are automatically treated with caustic, proved, salted, baked and then discharged into and mintained at constant temperature within said receiver.

8. A self-unloading pretzel oven comprising a generally parallelepipedal housing having a front wall and a rear wall; a generally horizontal plate dividing the interior of said housing into an upper proving zone and a communicating lower baking zone; a first continuous longitudinal conveyor within said proving zone adapted to transport edible products through said zone from front to rear; a second continuous longitudinal conveyor within said baking zone, positioned to receive products discharged from said first conveyor and transport them through said zone from rear to front; continuous spray means within said upper zone for treating edible products, being carried by said first conveyor, with caustic, including a spray header above said first conveyor, a trough beneath said first conveyor for receiving excess spray and an hydraulic circuit connecting said trough and spray head including a pump and a reservoir; means for salting the edible product at the time of transfer from said first conveyor to said second conveyor including means for varying the quantity of salt discharged and means for reclaiming salt not adhering to the edible product; a loading station proximate the front of said first conveyor; a finished product receiver outside said housing proximate the discharge point of said second conveyor into which edible products thereupon are continuously deposited; heating means within said lower baking zone which provide heat for baking, heat for the proving zone and heat for the caustic solution including an infrared radiator positioned so as to keep the contents of said finished product receiver warm; unitary synchronized drive means for said conveyors; and a thermostatic control for modulating a portion of said heating means; whereby unbaked products may be loaded at said loading station, automatically treated with caustic, proved, salted, baked, discharged and maintained at constant temperature.

9. The oven of claim 8 which further includes additional side walls, spaced apart from the side wall of said housing and means for creating a temperature reducing circulation of air in the space between said walls.

10. The oven of claim 8 wherein said finished product receiver is a wire basket including integral lugs and wherein, further, the front wall of said housing is provided with a plurality of sockets adapted to releasably receive and retain said lugs thus supporting said basket in product receiving position.

References Cited by the Examiner

UNITED STATES PATENTS 3,026,824 3/1962 Reach _____ 107—57

FOREIGN PATENTS 223,061 8/1942 Switzerland.

WALTER A. SCHEEL, *Primary Examiner.*

J. SHEA, *Examiner.*